US 9,843,936 B2

United States Patent
Fan et al.

(10) Patent No.: US 9,843,936 B2
(45) Date of Patent: Dec. 12, 2017

(54) METHOD FOR ALLOCATING COMMUNICATION CHANNELS TO ACCESS POINTS IN A COMMUNICATIONS NETWORK

(71) Applicant: KABUSHIKI KAISHA TOSHIBA, Tokyo (JP)

(72) Inventors: Zhong Fan, Bristol (GB); Fengming Cao, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 15/124,607

(22) PCT Filed: Apr. 28, 2014

(86) PCT No.: PCT/GB2014/051314
§ 371 (c)(1),
(2) Date: Sep. 8, 2016

(87) PCT Pub. No.: WO2015/166195
PCT Pub. Date: Nov. 5, 2015

(65) Prior Publication Data
US 2017/0048715 A1    Feb. 16, 2017

(51) Int. Cl.
*H04B 1/00* (2006.01)
*H04W 72/00* (2009.01)
(Continued)

(52) U.S. Cl.
CPC .......... *H04W 16/10* (2013.01); *H04B 17/318* (2015.01); *H04L 5/0069* (2013.01);
(Continued)

(58) Field of Classification Search
CPC ..... H04W 16/10; H04W 24/02; H04W 72/04; H04W 72/0453; H04W 72/082;
(Continued)

(56) References Cited

U.S. PATENT DOCUMENTS 6,311,067 B1   10/2001  Sammour et al.
7,260,620 B1 *  8/2007  Halasz .................. H04W 16/10
                                                    370/329
(Continued)

FOREIGN PATENT DOCUMENTS

EP   2 453 711 A1    5/2012
JP   2004-349883    12/2004

OTHER PUBLICATIONS

English-language Written Opinion from the International Searching Authority in PCT/GB2014/051314, dated Feb. 20, 2015.
(Continued)

*Primary Examiner* — Quochien B Vuong
(74) *Attorney, Agent, or Firm* — Finnegan, Henderson, Farabow, Garrett & Dunner, L.L.P.

(57) ABSTRACT

A method for allocating communication channels to access points in a communications network comprising: identifying, amongst the access points, one or more interference-prone pairs of access points, wherein each interference-prone pair comprises a first access point and a second access point that are currently using the same or overlapping communication channels to communicate with their respective client user devices, determining the number N of non-overlapping channels that are available for allocating to the access points; allocating the N non-overlapping channels between the access points in such a way as minimize the number of interference-prone pairs of access points; and where an access point cannot be allocated any one of the N channels without it comprising part of an interference-prone pair, selecting a particular one of the N channels to allocate to the access point based on a selection criterion.

16 Claims, 4 Drawing Sheets

(51) Int. Cl.
*H04W 16/10* (2009.01)
*H04B 17/318* (2015.01)
*H04L 5/00* (2006.01)
*H04L 12/723* (2013.01)
*H04W 72/04* (2009.01)
*H04W 84/12* (2009.01)

(52) U.S. Cl.
CPC .......... *H04L 5/0073* (2013.01); *H04L 45/507* (2013.01); *H04W 72/0486* (2013.01); *H04W 84/12* (2013.01)

(58) Field of Classification Search
CPC ..... H04W 84/12; H04W 88/08; H04W 88/12; H04W 92/20; H04B 1/40; H04B 15/00; H04B 15/02
USPC ........ 455/63.1, 450, 452, 455, 452.1, 67.13, 455/452.2, 453; 370/328, 329
See application file for complete search history.

(56) References Cited

U.S. PATENT DOCUMENTS

| | | | |
|---|---|---|---|
| 7,499,964 B2* | 3/2009 | Busch | H04W 16/10 370/328 |
| 7,848,758 B1 | 12/2010 | Sill et al. | |
| 7,983,232 B2* | 7/2011 | Benveniste | H04W 74/02 455/452.1 |
| 9,154,974 B2* | 10/2015 | Guey | H04W 24/02 |
| 9,497,639 B2* | 11/2016 | Meshkati | H04W 24/02 |
| 2008/0107071 A1 | 5/2008 | Tsigler et al. | |
| 2012/0244898 A1 | 9/2012 | Guey | |
| 2013/0235759 A1 | 9/2013 | Meshkati et al. | |
| 2016/0165555 A1* | 6/2016 | Jeong | H04W 52/243 455/447 |

OTHER PUBLICATIONS

English-language International Search Report from the European Patent Office in PCT/GB2014/051314, dated Feb. 20, 2015.

\* cited by examiner

METHOD FOR ALLOCATING COMMUNICATION CHANNELS TO ACCESS POINTS IN A COMMUNICATIONS NETWORK

FIELD

Embodiments described herein relate generally to methods and systems for allocating communication channels to access points in a communications network.

BACKGROUND

An important scenario in communication networks that implement Standards such as IEEE 802.11 HEW is that of dense deployment of APs (access points), e.g. in stadiums, shopping malls, and conference halls. In such applications, co-channel interference among access points is a major issue.

Conventionally, in such networks the channel assignment has been carried out using the method of Least Congested Channel Search (LCCS). In LCCS, each AP autonomously searches for the most lightly loaded channel, e.g., the channel with the fewest number of wireless clients. To achieve this, an AP first scans each channel for distinguishable beacons published by neighbouring APs. Since each beacon contains information such as the number of wireless clients associated with each AP, the AP then determines from each beacon how many clients are associated with each AP. After scanning all available channels, the AP knows how many clients are associated with each channel, and will choose to operate on the channel with the fewest number of associated clients.

There are known limitations of LCCS. For example, LCCS may fail to account for situations in which clients associated with different access points interfere with each other, whilst their respective access points do not interfere among themselves. In addition, channel re-use based on client distribution is not optimized in LCCS.

BRIEF DESCRIPTION OF FIGURES

Embodiments of the invention will now be described by way of example with reference to the accompanying drawings in which.

DETAILED DESCRIPTION

According to a first embodiment, there is provided a method for allocating communication channels to access points in a communications network, each access point serving as a port for connecting one or more client user devices to the communications network and being configured to communicate with its respective client user devices using one of the communications channels, the method comprising:

(i) identifying, amongst the access points, one or more interference-prone pairs of access points, wherein each interference-prone pair comprises a first access point and a second access point that are currently using the same or overlapping communication channels to communicate with their respective client user devices, wherein communications sent between the first access point in the pair and the first access point's client user devices are a source of interference for the second access point in the pair and/or the second access point's client user devices;

(ii) determining the number N of non-overlapping channels that are available for allocating to the access points; and (iii) allocating the N non-overlapping channels between the access points in such a way as minimise the number of interference-prone pairs of access points; and where an access point cannot be allocated any one of the N channels without it comprising part of an interference-prone pair, selecting a particular one of the N channels to allocate to the access point based on a selection criterion.

In some embodiments, each communication channel comprises a respective band of frequencies. Two communication channels may be considered to overlap if the band of frequencies used in one communication channel overlap either partially or wholly with the band of frequencies used in the second communication channel.

In some embodiments, the access points may communicate with their respective user devices through a code division multiple access CDMA scheme, in which different access points use the same band of frequencies to communicate with their respective client devices, but in which those different access points use different codes to modulate their respective transmissions. In this instance, each communication channel can be understood to comprise a particular one of those codes; two access points can be considered to be using overlapping communication channels if they use the same code to modulate the transmissions sent to their respective client user devices. Similarly, the access points can be allocated non-overlapping channels by allocating them different codes for modulating the transmissions sent between the access points and their respective client user devices.

In some embodiments, the selection is based on a number of client user devices currently connected to the communications network on each channel. The selection may be based on the total number of client user devices currently connected to the communications network on each channel.

In some embodiments, the selection is based on the number of potentially interfering client user devices currently connected to the communications network on each channel, wherein a potentially interfering client user device is one that is deemed likely to cause a threshold level of interference to the access point or the access point's respective client user devices in the event that the access point is allocated a particular channel. The potentially interfering client user devices may be identified based on knowledge of the client user device locations, or by scanning the different channels and detecting the strength of signals received from client user devices associated with each channel.

In some embodiments, the selection is based on the amount of network traffic being transmitted on each communication channel within a predetermined time period.

In some embodiments, the N non-overlapping channels are allocated to each access point in turn, based on the number of interference-prone pairs that each access point is identified as belonging to. The step of allocating the N non-overlapping channels between the access points may comprise:

assigning a label representative of a communication channel to each access point, each label having an associated rank, the labels being assigned to each access point in turn by:

(iv) identifying the access point belonging to the greatest number of interference-prone pairs and assigning said access point a label of lowest rank;

(v) identifying an unlabelled access point having the greatest degree of saturation, wherein the degree of saturation defines the number of labels of different rank that have already been assigned to other access points with which the unlabelled access point forms an interference-prone pair;

(vi) assigning the unlabelled access point a label having the lowest rank that differs from the rank of labels assigned to other access points with which the unlabelled access point forms an interference-prone pair; and (vii) repeating steps (v) and (vi) until all access points have been assigned a label;

determining the highest rank M of label that has been assigned to an access point; and where M>N:

allocating access points that have been assigned a label with a rank less than or equal to N with one of the N non-overlapping channels; and for each access point that has been assigned a label with a rank >N, selecting a particular one of the N channels to allocate to the access point based on a selection criterion.

In some embodiments, in the event that more than one unlabelled access points having the same degree of saturation is identified in step (v), the next access point to be assigned a label is the access point that forms the greatest number of interference pairs with access points that have yet to be assigned a label.

In some embodiments, in the event that an access point is allocated a communication channel based on the selection criterion, the selection criterion is reassessed at a later point in time to determine whether or not to allocate a different one of the N channels to the access point. In some embodiments, in the event it is determined, based on the selection criterion, to allocate a different one of the N channels to the access point, the access point will switch allocation channels with a probability p, where 0<p<1.

In some embodiments, the selection criterion is reassessed following the detection of a change in the number of client user devices connected to the network via the respective access points.

In some embodiments, the method comprises repeating each one of steps (i) to (v) at periodic intervals.

According to a second embodiment, there is provided a non-transitory computer readable storage medium comprising computer readable storage instructions that when executed by a computer will cause the computer to carry out a method according to the first embodiment.

Figure 1:
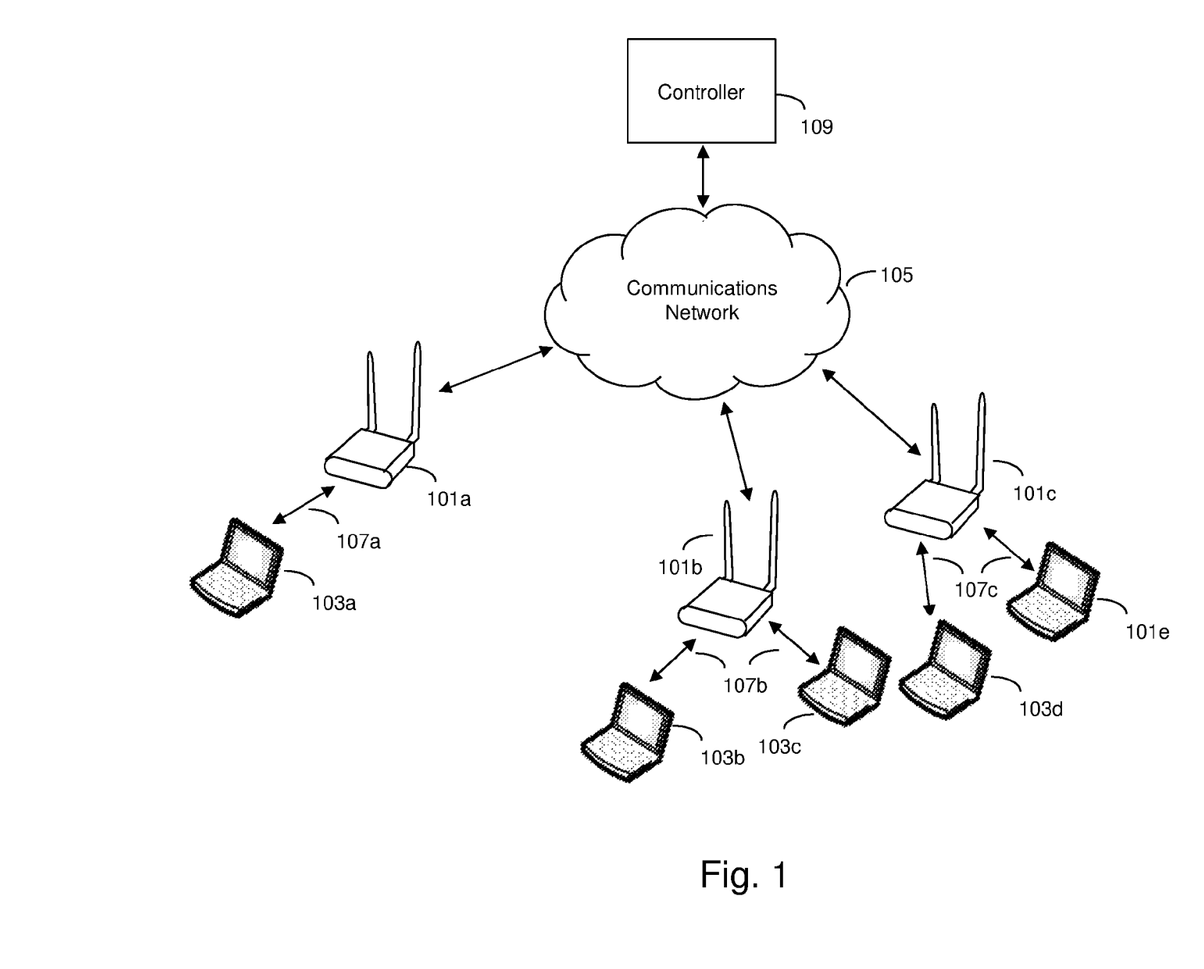
FIG. 1 shows a communication network in which a method according to an embodiment may be implemented.

FIG. 1 shows an example of a group of access points 101a, 101b, 101c that each serve as ports for connecting user devices 103a-103c to a communications network 105. Each access point communicates with its respective user devices over a respective wireless communications channel. For example, access point 101a may send and receive transmissions to and from user device 103a using a first band of frequencies 107a, whilst access point 101b may send and receive transmissions to and from the user devices 103b, 103c using a second band of frequencies 107b. Similarly, access point 101c may send and receive transmissions to and from the user devices 103d, 103e using a third band of frequencies 107c. (In another example, the access points may each communicate with their respective user devices using the same frequency bands, but using different codes to modulate their transmissions, akin to a CDMA scheme).

The network includes a central controller 109 with which the access points are able to communicate. The controller 109 is responsible for the management of the access points and performing tasks such as channel allocation, bandwidth signalling, load monitoring, etc.

Depending on the channels allocated to the different access points, interference may occur between access points and/or their respective user devices. In the arrangement shown in FIG. 1, the access point 101a is located distant from the access points 101b, 101c and therefore interference is unlikely to occur between the access point 101a and the other two access points 101b, 101c, even if they are allocated overlapping communication channels. However, since the access points 101b, 101c are themselves located closer together, interference may occur between the access points 101b, 101c if they are allocated the same communications channel. Even if the access points 101b, 101c themselves do not encounter direct interference from one another's transmissions, the fact that their respective user devices 103c, 103d are located in very close proximity to one another means that the user device 103c may encounter interference from transmissions being sent to and from the user device 103d and vice versa. For this reason, the access points 101b, 101c can be considered to comprise an interference-prone pair of access points. Embodiments described herein seek to allocate communication channels to different access points in such a way as to minimise the number of such interference-prone pairs of access points.

Figure 2:
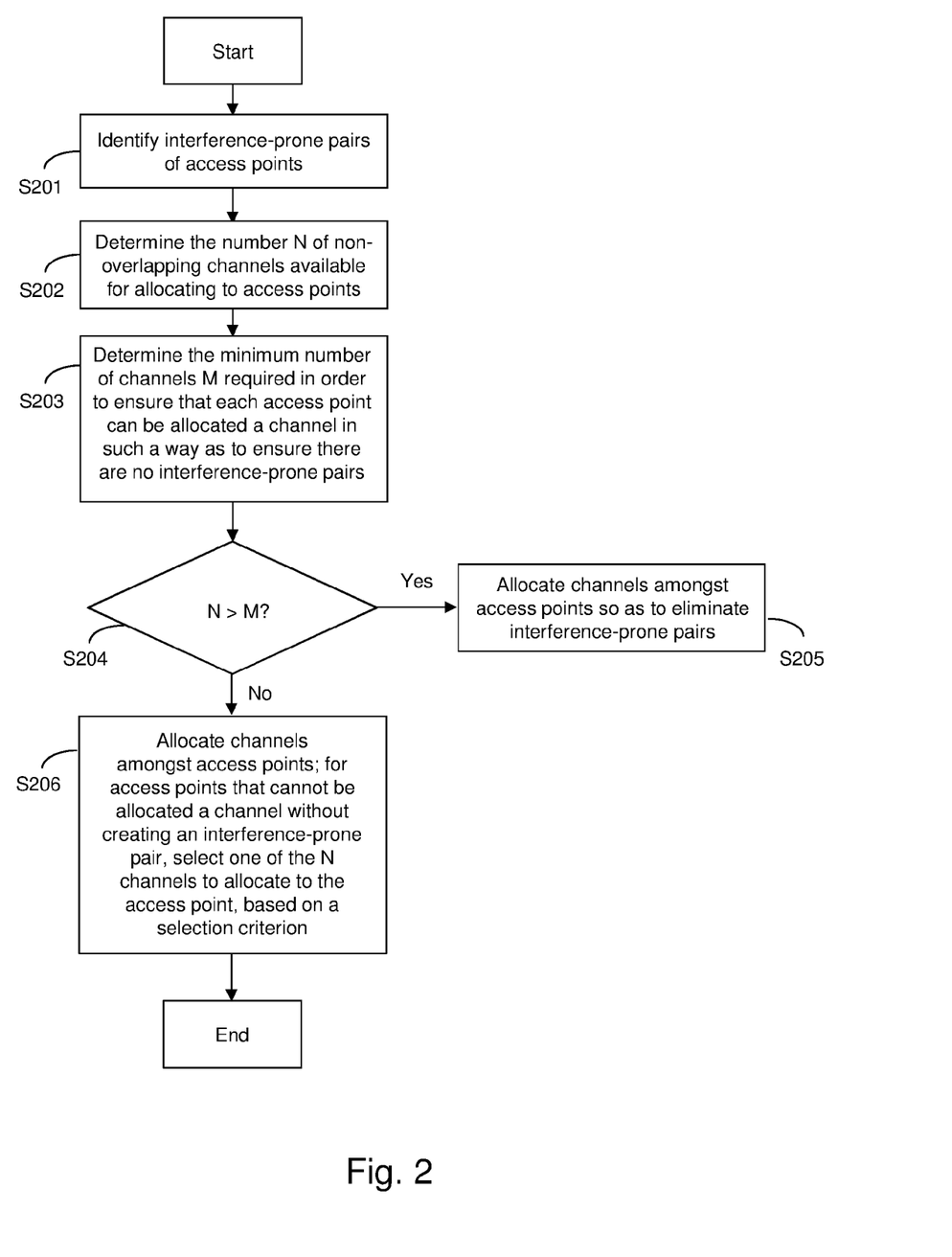
FIG. 2 shows a flow-chart of steps used in a method according to an embodiment.

An example embodiment of a method for allocating communication channels to access points in a communications network will now be described with reference to FIG. 2.

The method commences with the controller 109 receiving information from the different access points and using this to identify any interference-prone pairs of access points (step S201). The access points may use an Inter-AP Protocol (IAPP) to exchange neighbourhood information between themselves and the controller. For example, the access points may broadcast beacon signals including information such as MAC addresses of their respective user devices, the communication channel currently assigned to them, the signal-to-noise ratios and received signal strength that they and their respective user devices are experiencing.

In step S202, the controller determines the number N of non-overlapping channels that are available for allocating to the different access points. In 802.11 networks, there are a limited number of orthogonal (non-overlapping) channels available. For example, for 802.11b at 2.4 GHz, there are 3 orthogonal channels (channel number 1, 6, 11), as well as further, overlapping channels. In Standard 802.11ac (and HEW at 5 GHz, there are 25 channels of 20 MHz width. The 802.11ac Standard also allows dynamic channel width adaptation on a per-frame basis, from 20 MHz to 40 MHz, 80 MHz and all the way up to 160 MHz. For example, within the spectrum from channel 36 to channel 64 at 5 GHz, two access points can be allocated an 80 MHz channel each. Alternatively, four access points can be allocated a 40 MHz channel each, or eight access points can be allocated a 20

MHz channel each, and so on. Whilst by no means essential, it will be assumed in the following that the smallest channel unit has a width of 20 Hz.

Next, in step S203, the controller determines the minimum number of channels M that would be required in order to ensure that each access point could be allocated a channel without there being any interference-prone pairs of access points i.e. the minimum number of channels required to ensure that, for each pair of identified interference-prone access points, the two access points in that pair can be allocated different channels.

In step S204, a determination is made as to whether the number of available channels N exceeds the minimum number of channels M; if so, the controller proceeds to step S205. Here, the controller allocates the channels amongst the access points in such a way as to eliminate the pairs of interference-prone access points identified in step S201.

In the event that the minimum number of channels M exceeds the number of available channels N, it will not be possible to eliminate all the identified pairs of interference-prone access points. In this case, the controller will allocate the channels in turn, in such a way as to minimise the number of interference-prone pairs. Since M>N, the controller will ultimately identify one or more access points that cannot be allocated a channel without the access point in question still comprising part of an interference-prone pair (it can be seen that it will not be possible for an access point to fall into this category unless it was previously identified as belonging to at least N different interference-prone pairs in step S201; in the event that an access point is identified as belonging to fewer than N different interference-prone pairs, there will always be at least one channel available for allocating to the access point that differs from the channels allocated to the other access points in those respective pairs). For such an access point, a choice must be made as to which one of the N channels to allocate to it and by extension, which one of the pair(s) of interference-prone pairs that the access point was identified as belonging to in step S201 is to remain as an interference-prone pair. Here, the controller will base its selection of the channel on a selection criterion (step S206).

In one embodiment, the selection may be based on a number of user devices that are currently associated with each of the N channels (i.e. a number of user devices that are associated with access point(s) transmitting on the respective channels). An individual access point may identify the total number of user devices associated with each channel in its neighbourhood by scanning each one of those channels. Alternatively, the controller may scan the channels and inform the access point of the number of user devices associated with each channel. In one example, the access point may select the channel with the fewest number of associated user devices.

In an alternative embodiment, the controller may monitor the actual traffic load on each channel for a certain period of time T. The access point may then select the channel that has the smallest load.

In a still further embodiment, the choice of which communication channel to allocate to the access point may be based on the number of potentially interfering user devices associated with each channel, rather than the actual total number of clients on that channel. Here, a potentially interfering client user device is one that is operating on a particular communication channel, and which is considered likely to cause a threshold level of interference to the access point or the access point's associated client user devices (or which is considered likely to experience a threshold level of experience from the access point or the access point's associated user devices) in the event that the access point is allocated the same channel. It is possible, for example, that there may be a choice between two channels, both of which already have a large, equal number of user devices associated with them, but where the user devices associated with one of the two channels are located further away from the access point in question than the user devices associated with the other communication channel. In such a case, the access point (or controller) may focus on the actual number of client user devices for which interference is likely to pose an issue, rather than the total number of user devices operating on that particular channel.

One way of determining the number of potentially interfering user devices is for the access point to scan each channel and to record the number of user devices operating on each channel for which the strength of the signal received at the access point is above a threshold. Another possibility is to determine the number of potentially interfering client user devices based on knowledge of each client user device's location. For example, each client user device may broadcast GPS data indicating its location to its respective access point, which may then forward that data to the controller or other access points in order to map the location of each client user device.

The process of determining how best to allocate the available channels between the access points in such a way as to minimise the number of interference-prone pairs of access points will now be discussed in more detail. One of a number of different heuristics may be used for this channel allocation problem.

The channel allocation problem can be treated as a graph vertex colouring problem. In this approach, the controller uses its knowledge of the pairs of interference-prone access points to construct an interference or conflict graph $G(V, E)$, where each access point lies at a respective vertex V of the graph and pairs of access points that are identified as being interference-prone are connected by an edge E drawn between their respective vertices. The controller will then seek to assign a type of label to each vertex of a graph, such that no edge connects two identically labelled vertices, whilst the total number of labels is minimized. In the present example, the labels are colours, hence the term "vertex colouring problem"; however, it is by no means essential to select colours as the labels. The goal of channel allocation is to optimize channel utilization while assigning different channels to any two vertices connected by an edge of the graph. This is a typical graph vertex colouring problem, which is NP-hard.

The minimum number of colours with which the vertices of the graph G can be coloured is called the chromatic number, denoted by $X(G)$ (note that $X(G)=M$, as defined above). The number of available non-overlapping channels will be N. When $N>X(G)$, it is possible to allocate each access point a non-overlapping channel, such that there will be no interference (this is the scenario indicated in step S205 of FIG. 2). When $N<X(G)$, it will be necessary to allocate the same channel to at least two access points that have already been identified as comprising an interference-prone pair of access points. These access points will then share the same Basic Service Set (BSS). Note that, within a BSS, the IEEE 802.11 MAC will perform Carrier Sense Multiple Access (CSMA) to reduce collisions. Therefore, allocating the same channel to two such access points may be preferable to allocating the two access points two overlapping channels with small channel distances.

Any efficient graph colouring algorithm can be used for colouring the graph. One example of such an algorithm is the DSATUR (degree of saturation) algorithm, which provides a simple and yet effective graph colouring method.

Figure 3:
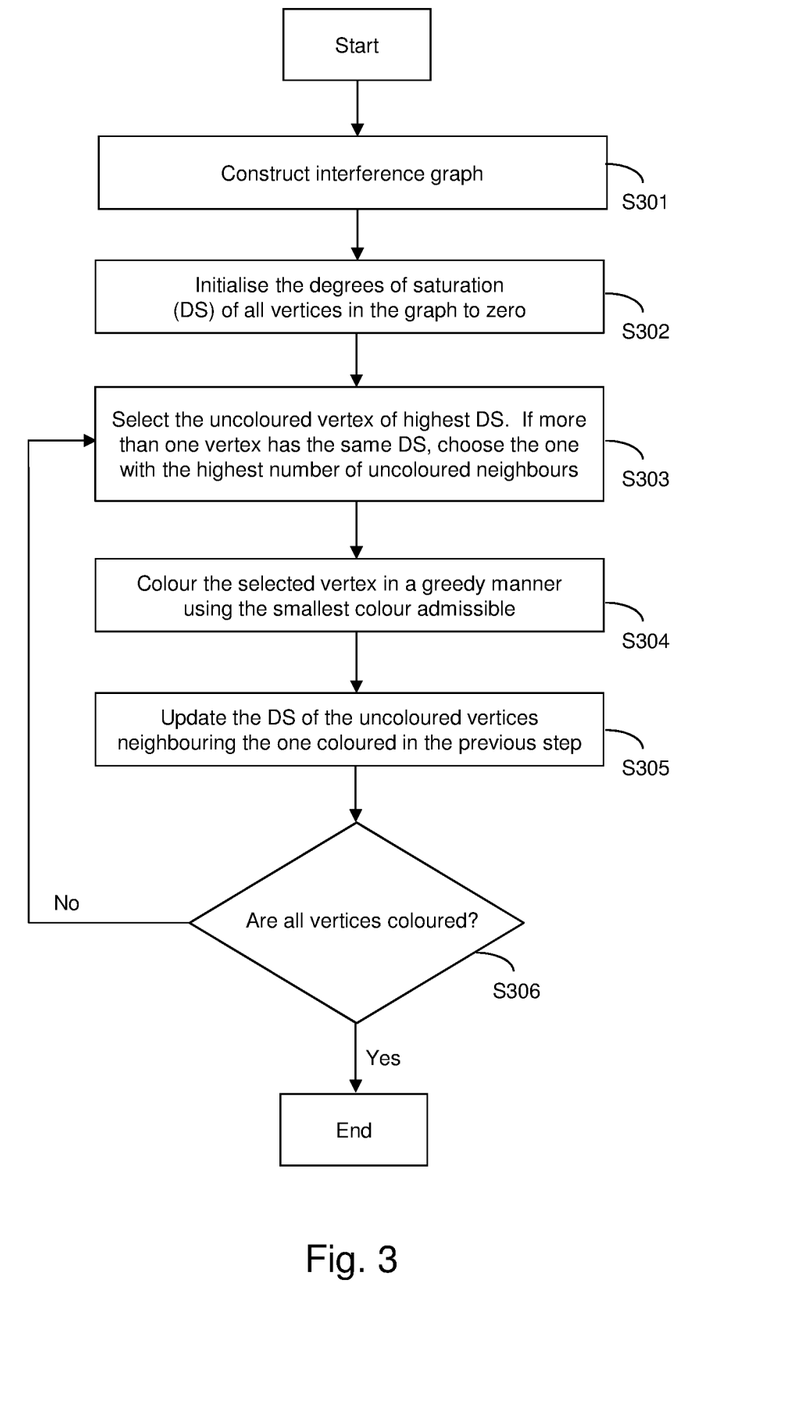
FIG. 3 shows a further flow-chart of steps used in a method according to an embodiment.

The DSATUR algorithm can be explained by reference to FIG. 3. Here, the degree of saturation is defined as the number of colours used in the neighbourhood of a vertex (i.e. the total number of colours that have been allocated to vertices that share an edge with the vertex in question). In step S301, the controller uses the knowledge of the interference-prone access points to construct the interference graph. In step S302, the degree of saturation of each vertex is set to zero. In step S303, a vertex is chosen to be allocated a colour. The vertex that is chosen is the one with the highest degree of saturation. In the event that there is more than one vertex with the same degree of saturation (as will be the case immediately following initialisation in Step S302, when each vertex has a zero degree of saturation), the vertex that is chosen is the one with the highest number of uncoloured neighbouring vertices.

Once a vertex has been chosen, a colour is assigned to that vertex (step S304). Each colour has an associated rank. The colour assigned to the vertex is the colour having the lowest rank that differs from colours that have already been assigned to vertices that share a edge with the vertex in question. In step S305, the degrees of saturation of the uncoloured vertices are updated to take account of the colour assigned to the vertex in step S304. In step S306, it is determined whether or not there are any remaining uncoloured vertices that can be assigned a colour. If so, the method returns to step S303. Steps S303-S306 continue to be repeated until all vertices have been assigned a colour. At this point, the total number of colours used for the graph is determined.

In the event that X(G)>N, it is possible to define Y=X(G)−N. Once every vertex in the graph has been completed, it is possible to define two sets of vertices S1 and S2. Here, S1 is the set of vertices of the graph with a colour whose associated rank is less than or equal to N. The remaining vertices will belong to the set S2. It can be seen that vertices in the set S2 will have a total of Y colours between them. The set S2 comprises the group of access points that cannot be allocated a channel without the access point in question still comprising part of an interference-prone pair; each access point belonging to set S2 will be required to share a channel with one of its neighbours. Precisely which one of the N channels that are assigned to the access points in the set S2 will be determined on an individual basis using a selection criterion, as discussed above.

It will of course be understood that the DSATUR algorithm is one of several heuristics available that can be used in the channel allocation problem. For example, to obtain a more accurate graph colouring, one can use iterated greedy algorithms following DSATUR to iteratively revise the colouring.

Given an accurate graph, the proposed method can avoid interference between access points and yet achieve higher spectrum utilization (channel reuse). When N>=X(G), the graph colouring algorithm makes use of all the available non-overlapping channels.

Although graph colouring is generally NP-hard, the DSATUR heuristic has a polynomial time complexity. The DSATUR algorithm provides a fast and effective means for colouring the graph. It should also be noted that for most graphs, DSATUR yields optimal colouring.

Figure 4:
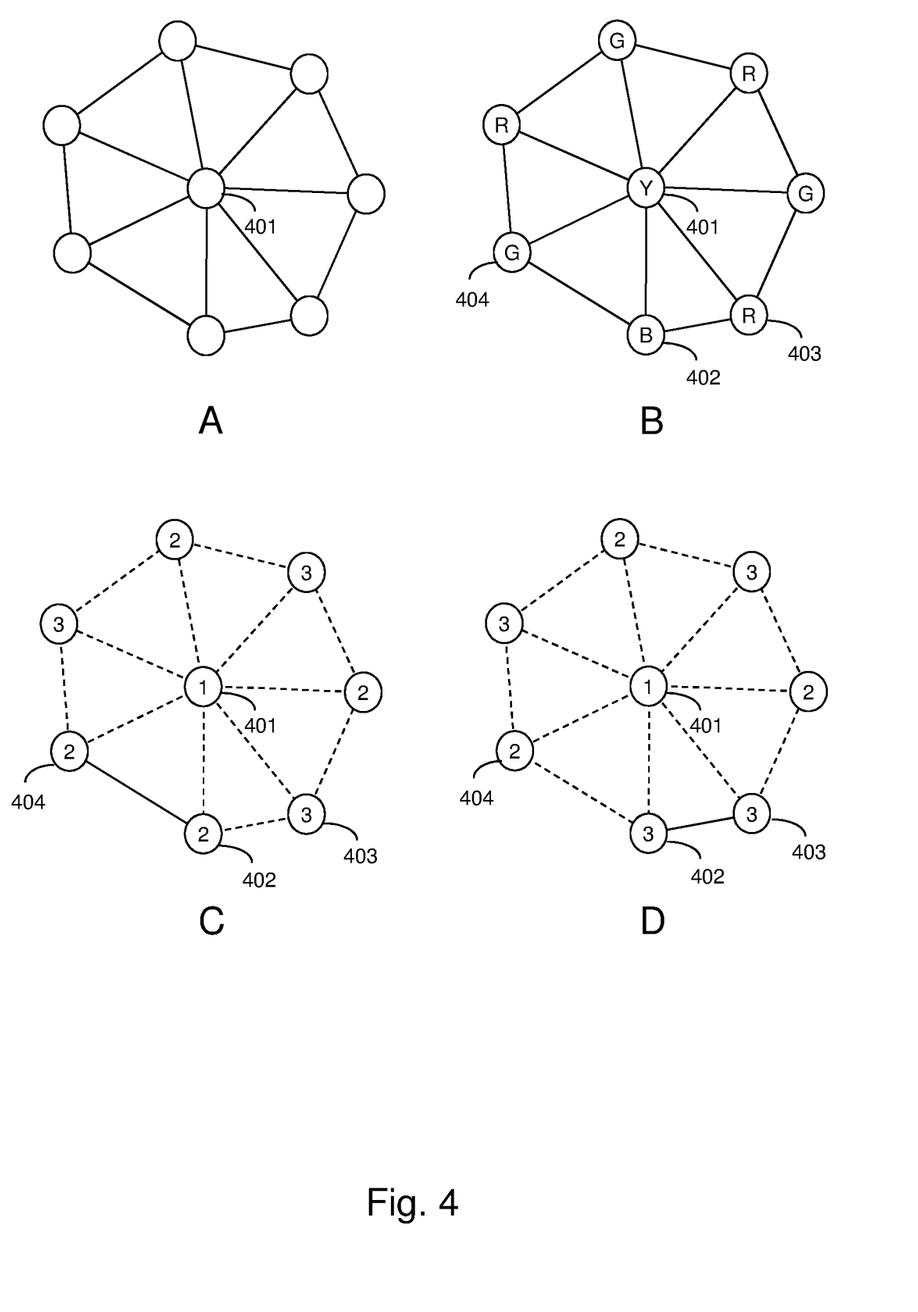
FIG. 4 shows an example of how communication channels may be allocated to different access points by constructing an interference graph, according to an embodiment.

FIG. 4 illustrates an example of how channels may be allocated between the different access points according to an embodiment. FIG. 4A shows an example of an interference graph that is constructed by identifying pairs of interference-prone access points in a network. Here, the vertices (shown as circles) in the graph represent 8 different access points. Where two circles are shown to be connected by a line, this signifies that the respective access points form two halves of an interference-prone pair of access points. It can be seen that the access point 401 at the centre of the graph forms one half of seven different interference-prone pairs (i.e. it forms an intersection with 7 lines on the graph), whilst the other access points shown in the graph each belong to 3 interference-prone pairs of access points.

FIG. 4B shows an example of how the network graph may look once it has been coloured using the DSATUR algorithm. Each vertex has been assigned, in order of preference, one of 4 colours Yellow, Green, Red and Blue, indicated by the letters Y, G, R and B, respectively. Here, the chromatic number X(G) for the graph is 4 i.e. the minimum number of colours that is required to ensure that any two vertices that are connected by a line have different colours assigned to them is 4.

FIG. 4C shows an example of how the interference graph may be used as a basis for allocating channels amongst the access points, in the event that the number of non-overlapping channels available N is equal to 3. In FIG. 4C, the numbers 1 to 3 reflect the channels allocated to each access point, where those numbers correspond to the respective rank of the colours Yellow, Green and Red seen in the graph of FIG. 4B. Since N<4, it follows that the access point 402 whose vertex on the graph was coloured blue in FIG. 4B must be allocated the same channel as one of the three access points 401, 403, 404 with which it had previously been identified as forming an interference-prone pair.

It can be seen that, regardless of which of the 3 available channels is allocated to the access point 402, it will still form an interference-prone pair with one of the three access points 401, 403, 404. The choice of which of those channels to allocate to the access point, and by extension, which one of the pairs of interference-prone access points is to be retained, is based on a selection criterion. In the present example, the selection comprises determining the channel that has the smallest amount of network traffic (least loaded channel), which in the example shown is channel 2. To aid understanding, in FIG. 4C, where pairs of interference-prone access points that were originally identified in FIG. 4A have been eliminated, those pairs are shown as being connected by dashed lines. The remaining pair of interference-prone access points 402, 404 is shown as being connected by a solid line.

The channel allocation may be updated periodically or in response to a change of network topology. Where the topology of the access points changes because new access points have been added or existing ones have been taken down, for example, the graph colouring algorithm may run again.

In practice, changes to the topology of the access points are likely to occur over a relatively long time scale. The actual load on the network is likely to change over a shorter time scale as new clients (user devices) join or existing clients disconnect from a particular access point. In the event that an access point has been maintained as part of an interference-prone pair and it is subsequently determined that the load on one or more channels has changed, the controller or the access point itself may reassess whether the access point in question should maintain its current communication channel, or switch to another communication channel. In other words, the access point may switch from being one half of a first interference-prone pair to being one half of a different interference-prone pair that operates on a different channel, but for which the overall impact on performance is improved. An example is provided in FIG. 4D, which shows the allocation of channels in the network at a time point subsequent to that shown in FIG. 4O. Here, the access point 402 that was allocated the channel 2 in FIG. 4O has switched to channel 3, thereby forming a new interference-prone pair with the access point 403, whilst ceasing to form an interference-prone pair with the access point 404.

Changes such as that discussed above in relation to FIG. 4D may be made dependent on the change in load on a particular channel being above a threshold. Alternatively, or in addition, where such a change in load on the channel is observed, the access point may switch to the new channel with a probability p, where p is set so as to avoid the access point oscillating between different channels in a dynamic environment.

Thus, embodiments described herein can help to optimize spectrum usage (enhancing channel reuse). Embodiments can also improve load balancing and help to mitigate co-channel interference. In addition, while certain embodiments have been presented by way of example only, and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the inventions.

The invention claimed is:

1. A method for allocating communication channels to access points in a communications network, each access point serving as a port for connecting one or more client user devices to the communications network and being configured to communicate with its respective client user devices using one of the communications channels, the method comprising:
  (i) identifying, amongst the access points, one or more interference-prone pairs of access points,
    wherein each interference-prone pair comprises a first access point and a second access point that are currently using the same or overlapping communication channels to communicate with their respective client user devices,
    wherein communications sent between the first access point in the pair and the first access point's client user devices are a source of interference for the second access point in the pair and/or the second access point's client user devices;
  (ii) determining the number N of non-overlapping channels that are available for allocating to the access points, determining the minimum number of channels M that would be required in order to ensure that each access point could be allocated a channel without there being any interference-prone pairs of access points, and determining whether the number N of non-overlapping channels exceeds the minimum number of channels; and
  (iii) allocating the N non-overlapping channels in turn between the access points in such a way as to eliminate the pairs of interference-prone access points when N≥M and in such a way as to minimise the total of interference-prone pairs of access points when M>N; and
  when M>N and an access point cannot be allocated any one of the N channels without it comprising part of an interference-prone pair, selecting a particular one of the N channels to allocate to the access point based on a selection criterion.

2. A method according to claim 1, wherein each non-overlapping communication channel comprises a different band of frequencies.

3. A method according to claim 1, wherein the selection is based on a number of client user devices currently connected to the communications network on each channel.

4. A method according to claim 3, wherein the selection is based on the total number of client user devices currently connected to the communications network on each channel.

5. A method according to claim 3, wherein the selection is based on the number of potentially interfering client user devices currently connected to the communications network on each channel, wherein a potentially interfering client user device is one that is deemed likely to cause a threshold level of interference to the access point or the access point's respective client user devices in the event that the access point is allocated a particular channel.

6. A method according to claim 5, wherein the potentially interfering client user devices are identified based on knowledge of the client user device locations.

7. A method according to claim 5, wherein the potentially interfering client user devices are identified by scanning the different channels and detecting the strength of signals received from client user devices associated with each channel.

8. A method according to claim 1, wherein the selection is based on the amount of network traffic being transmitted on each communication channel within a predetermined time period.

9. A method according to claim 1, wherein the N non-overlapping channels are allocated to each access point in turn, based on the number of interference-prone pairs that each access point is identified as belonging to.

10. A method according to claim 9, wherein the step of allocating the N non-overlapping channels between the access points comprises:
  assigning a label representative of a communication channel to each access point, each label having an associated rank, the labels being assigned to each access point in turn by:
    (iv) identifying the access point belonging to the greatest number of interference-prone pairs and assigning said access point a label of lowest rank;
    (v) identifying an unlabelled access point having the greatest degree of saturation, wherein the degree of saturation defines the number of labels of different rank that have already been assigned to other access points with which the unlabelled access point forms an interference-prone pair;
    (vi) assigning the unlabelled access point a label having the lowest rank that differs from the rank of labels assigned to other access points with which the unlabelled access point forms an interference-prone pair; and
    (vii) repeating steps (v) and (vi) until all access points have been assigned a label;

determining the highest rank M of label that has been assigned to an access point; and where M>N:

allocating access points that have been assigned a label with a rank less than or equal to N with one of the N non-overlapping channels; and for each access point that has been assigned a label with a rank >N, selecting a particular one of the N channels to allocate to the access point based on a selection criterion.

11. A method according to claim 10, wherein in the event that more than one unlabelled access points having the same degree of saturation is identified in step (v), the next access point to be assigned a label is the access point that forms the greatest number of interference pairs with access points that have yet to be assigned a label.

12. A method according to claim 1, wherein in the event that an access point is allocated a communication channel based on the selection criterion, the selection criterion is reassessed at a later point in time to determine whether or not to allocate a different one of the N channels to the access point.

13. A method according to claim 12, wherein in the event it is determined, based on the selection criterion, to allocate a different one of the N channels to the access point, the access point will switch allocation channels with a probability p, where $0<p<1$.

14. A method according to claim 12, where the selection criterion is reassessed following the detection of a change in the number of client user devices connected to the network via the respective access points.

15. A method according to claim 10, comprising repeating each one of steps (i) to (v) at periodic intervals.

16. A non-transitory computer readable storage medium comprising computer readable storage instructions that when executed by a computer will cause the computer to carry out a method according to claim 1.

* * * * *